United States Patent
Ouvrier-Buffet et al.

(10) Patent No.: US 6,316,770 B1
(45) Date of Patent: Nov. 13, 2001

(54) THERMAL DETECTOR WITH BOLOMETRIC EFFECT AMPLIFICATION

(75) Inventors: Jean-Louis Ouvrier-Buffet, Sevrier; Jean-Jacques Yon, Sassenage, both of (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/340,828

(22) Filed: Jun. 28, 1999

(30) Foreign Application Priority Data

Jul. 6, 1998 (FR) .................................................. 98-08613

(51) Int. Cl.⁷ .................................................. H01L 27/18
(52) U.S. Cl. .................................. 250/338.1; 250/338.4; 250/336.1; 250/349
(58) Field of Search ............................. 250/338.1, 338.4, 250/336.1, 349

(56) References Cited

U.S. PATENT DOCUMENTS

| | | |
|---|---|---|
| 2,865,202 | 12/1958 | Bennett . |
| 4,853,538 * | 8/1989 | Jackson ............................. 250/338.4 |
| 5,825,029 | 10/1998 | Agnese et al. . |
| 5,912,464 | 6/1999 | Vilain et al. . |

FOREIGN PATENT DOCUMENTS

| | | |
|---|---|---|
| 44 03 947 | 11/1994 | (DE) . |
| 354-369 * | 2/1990 | (EP) .................................. 250/338.4 |
| 2 207 501 | 1/1989 | (GB) . |
| 9-79128 | 8/1984 | (JP) . |

OTHER PUBLICATIONS

Polyconductor Beam Power Sensor, Int. J. Electronics, 1991, vol. 71, No. 2, 363–381.

* cited by examiner

Primary Examiner—Constantine Hannaher
Assistant Examiner—Andrew Israel
(74) Attorney, Agent, or Firm—Pearne & Gordon LLP

(57) ABSTRACT

This detector has a resistive element (4) able to undergo heating which is provided with electrical biasing means (6, 8) for amplifying or increasing the heating, a thermometer (12) thermally coupled to the element and converting a temperature variation undergone by the thermometer into an electric signal, and a device (18) for reading the electric signal. The invented detector can be applied to measure and detect infrared radiation. The detector can also be applied to measure and detect radiation of different wavelengths.

13 Claims, 5 Drawing Sheets

THERMAL DETECTOR WITH BOLOMETRIC EFFECT AMPLIFICATION

TECHNICAL FIELD

The present invention relates to a thermal detector and more particularly to an uncooled thermal detector.

PRIOR ART

A known, uncooled thermal detector comprises a thermometer, whereof an electrical property varies as a function of the temperature. The latter varies when a radiation, which is characteristic of the temperature and the emissivity of an observed body and whose wavelength can belong to band III (wavelength range 8 to 12 μm), is absorbed by an appropriate means thermally coupled to the thermometer, such as e.g. an absorbing layer or an antenna formed on said thermometer.

The known, uncooled, thermal detectors differ by the manner of converting into an electric signal the temperature variation due to the incident radiation and in particular bolometric detectors are known, whose thermometers use resistive materials.

More specifically, the thermometers of known bolometric detectors comprise elements, whose resistivity varies as a function of the temperature and which are biased with a voltage or current source in the continuous or pulsed mode. The resistivity variations and consequently the electrical resistance produce voltage or current variations at the terminals of said detectors.

For materials having a negative temperature coefficient such as e.g. semiconductors, the measurement at a constant voltage, when the latter exceeds a critical value, leads to a self-destruction of a bolometric detector if there is no biasing decrease. Thus, with a voltage biasing (V), the power dissipation ($P=V^2/R$) leads to a reduction in the resistance R of the detector, which increases the dissipated power, leading to a thermal runaway. In reality, there is a limit operating temperature beyond which the detector runs away when biased by a d.c. voltage. All the same, the detector has its best response performance characteristics close to said instability conditions.

Bolometers incorporating materials with a positive temperature coefficient, such as e.g. metals, have an identical behaviour when biased by a constant current source. Thus, with a current biasing (I), the power dissipation ($P=RI^2$) leads to an increase in the resistance R of the detector, which increases the dissipated power.

DESCRIPTION OF THE INVENTION

The present invention relates to a thermal detector of the uncooled type, whose performance characteristics are significantly better than those of known detectors of this type and which uses for this purpose the aforementioned thermal runaway phenomenon (but appropriately limited so as not to lead to the destruction of the detector).

More specifically, the present invention relates to a thermal detector, characterized in that it comprises:

- a resistive element able to undergo a heating and provided with electrical biasing means for amplifying or increasing said heating,
- a thermometer thermally coupled to the resistive element and able to convert a temperature variation undergone by said thermometer into an electric signal and
- means for reading said electrical signal.

The optimization of the thermometer of said detector and the reading mode of the thermometer leads to a marked increase in the response and to a marked decrease in noise compared with known, uncooled, thermal detectors.

According to a preferred embodiment of the detector according to the invention, the resistive element comprises at least one resistive layer and the biasing means comprise two electrodes, the assembly formed by said layer and said two electrodes being electrically insulated from the thermometer.

According to a first special embodiment, the electrodes are placed on the same side of the resistive layer and, according to a second special embodiment, they are placed on either side of said layer.

The resistive element can have a negative temperature coefficient, the biasing then being a voltage biasing.

In this case, the resistive element can be made from a semiconductor material, which is preferably chosen from among the oxides of vanadium, amorphous silicon and amorphous SiGe.

As a variant, the resistive element can have a positive temperature coefficient, the biasing then being a current biasing.

According to a special embodiment of the detector according to the invention, the thermometer is chosen from within the group including thermopiles or thermobatteries, p-n junctions, Schottky junctions or barriers, electrical resistances, ferroelectric thermometers, pyroelectric thermometers, mechanical deformation thermometers and in particular pneumatic thermometers, and thermometers having at least one microtip.

Preferably, the thermometer is made by a microelectronics procedure so as to have a low heat capacity.

Preferably, the resistive element is produced by a microelectronic procedure.

According to a preferred embodiment of the invention, the detector has a microbridge structure.

The invention also relates to a thermal detector having a matrix structure comprising at least two thermal detectors with bolometric amplification according to the invention.

The detectors according to the invention apply in general terms to the measurements of temperatures and in particular infrared detection, each resistive element then being provided for undergoing heating by means of an infrared radiation, as well as for the detection of nuclear radiation (e.g. neutrons, X-rays, Y-rays).

BRIEF DESCRIPTION OF THE DRAWINGS

The invention is described in greater detail hereinafter relative to non-limitative embodiments and with reference to the attached drawings, wherein show.

DETAILED DESCRIPTION OF EMBODIMENTS

Figure 1A:
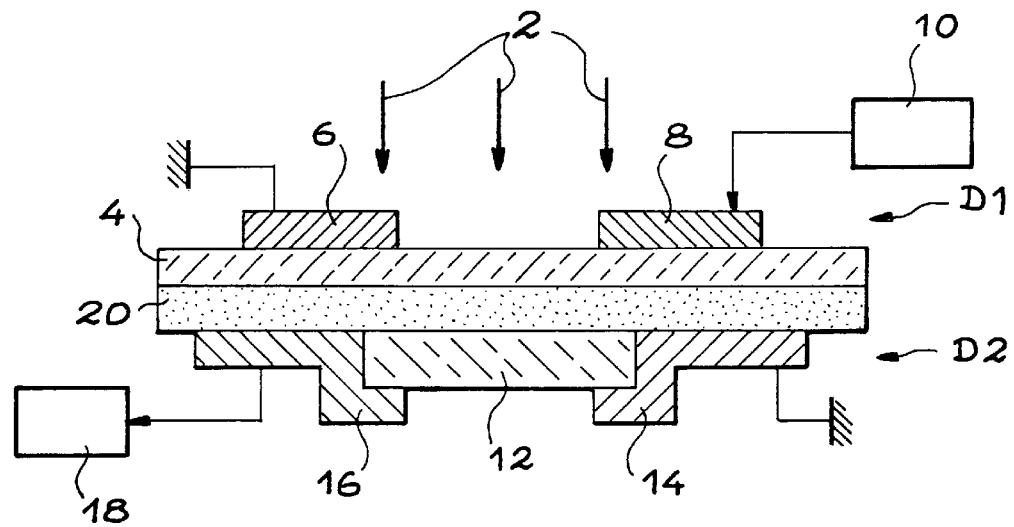
FIGS. 1A, 1B, 2, 3, 4, 5A, & 5B Diagrammatic views of various embodiments of the thermal detector according to the invention.

FIG. 1A is a diagrammatic view of a special embodiment of the thermal detector according to the invention, which is formed on a not shown substrate and which is thermally insulated from said substrate.

In such a detector, use is made of the bolometer runaway phenomenon in order to bring about an amplification or increase of the heating of said detector, e.g. induced by an incident infrared radiation 2. Said amplification function is also separated from the temperature measuring function. When considering e.g. a scene (one or more not shown objects), whereof it is wished to measure the temperature, the heating increase is represented by the following equation:

$$dT = A(T) \cdot dT_s \qquad (1)$$

in which A(T) represents the temperature gain, which is dependent on the temperature T of the resistive element biased by a voltage source or a current source, in the continuous mode or pulsed mode, in order to increase the heating, $dT_s$ representing the temperature variation of the scene (which emits infrared radiation 2) and dT represents the variation of the temperature of the resistive element 4 of the detector of FIG. 1A.

This detector comprises two thermally coupled devices D1 and D2. Device D1, which has a heating increase function, comprises a resistive element 4 formed by a semiconductor or metal layer provided with two electrodes 6 and 8. The electrode 6 is earthed or grounded and the electrode 8 is biased by a voltage or current source 10, which permits the amplification of the heating of device D1 produced by the radiation 2. This radiation is absorbed by a not shown means thermally coupled to the device D1 or simply absorbed by the resistive element 4 and the electrodes 6, 8.

It is pointed out that when the element 4 is semiconductive (or metallic), the source 10 is a voltage source (respectively a current source), said voltage or current not exceeding a critical value (which can be determined by the expert) beyond which damage would occur to the device D1.

Device D2, which solely has the function of measuring a temperature or temperature fluctuations, comprises a thermometer 12 having two electrodes 14, 16, the electrode 14 being earthed or grounded and the electrode 16 being connected to an input of a reading circuit 18 for the signal supplied by the thermometer with a view to knowing the temperature of the scene observed.

The source 10 and reading circuit 18 can be integrated into the substrate (30, 48, 56, 64, 70, 92 respectively in FIGS. 2, 3, 4 and 5A (as well as 5B and 6), 7 and 8). Hereinafter, any contact of the detector with the substrate can be considered as a mechanical and/or electrical contact.

Devices D1 and D2 are respectively formed on two opposite faces of an electrically insulating, but thermally conductive layer 20.

The electrodes 6 and 8 are coplanar and are placed on the same face of the metal or semiconductor layer 4. However, it is possible to adopt another configuration (FIG. 1B) in which the electrodes 4, 6 face one another. They are then placed on two opposite faces of said semiconductor or metal layer 4.

The amplification function results directly from the electrothermal behaviour of the resistive device D1 and said behaviour is described by the heat equation.

Considering in exemplified manner a device D1 formed by a semiconductor thermistor of resistance $R_b$, which is biased by a voltage pulse. The resistance variations as a function of the temperature are represented by the following equation:

$$R_b(T) = R_b(T_0) e^{(1/T - 1/T_0)(E_a/K)} \qquad (2)$$

In this example, the heat equation is written:

$$C\frac{dT}{dt} + G(T - T_0) = \frac{V_{Pol} R_b(T_0) e^{(1/T - 1/T_0)(E_a/K)}}{(R_b(T_0) e^{(1/T - 1/T_0)(E_a/K)} + R_l)^2} + a(T_s^4 - T^4) \qquad (3)$$

In these equations (2) and (3), C is the heat capacity of the detector, G the thermal conductance of said detector, t represents the time, T the operating temperature of the thermistor, $T_0$ a reference temperature, i.e. in exemplified manner the temperature of the substrate, $T_s$ is the temperature of the scene, a is the optical coupling coefficient of the thermal detector, $V_{pol}$ is the biasing voltage, $R_l$ is a possible load resistance ($R_l$ equal to or higher than 0) which can be connected in series with the resistance $R_b$, $E_a$ is the activation energy of the material constituting the resistance or resistor $R_b$ and K is the Boltzmann constant.

Equation (3) has no analytical solution and it must be solved numerically. It clearly reveals the amplification of the response $dT/dT_s$ as a function of $V_{pol}$ and the duration of the pulse, i.e. the temperature of the thermistor at the end of said pulse. A current pulse applied to a metallic resistive element leads to the same conclusions.

This amplification phenomenon also arises with a continuous biasing, but the detector is then exposed to a destruction risk by thermal runaway. It is therefore appropriate to reduce the voltage or current swing, which also limits the gain $dT/dT_s$ to relatively low values.

What has been stated hereinbefore shows that an appropriately biased resistive element leads to a significant amplification of its temperature variation compared with that which would be registered with the same unbiased, resistive element, in response to an identical variation of the temperature of the scene. The gain, which can range from 2 (in the continuous mode) to 1000 (in the pulsed mode) amplifies the response of the thermometer.

Figure 2:
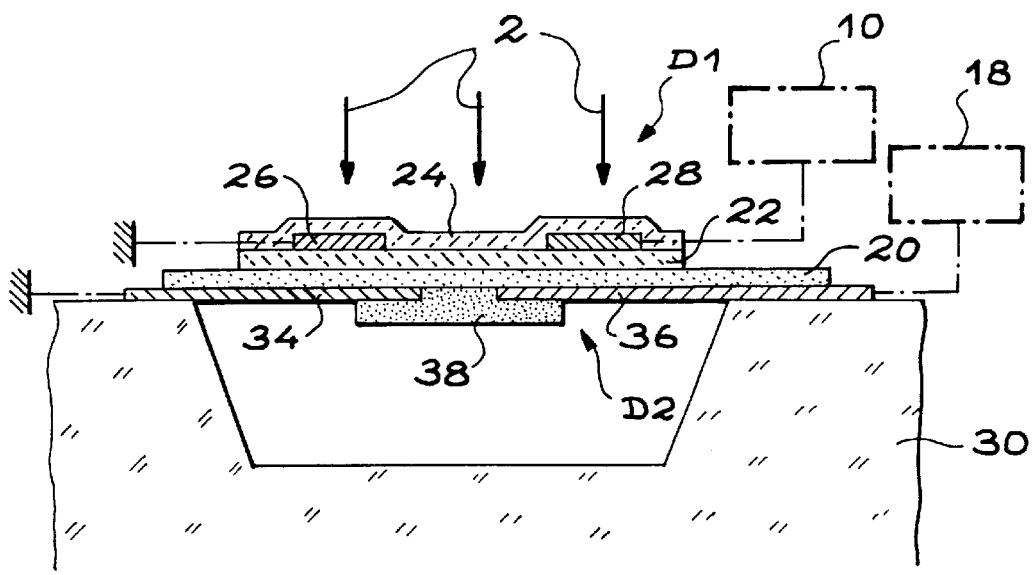

The thermal detector according to the invention diagrammatically represented in FIG. 2, comprises a resistive element formed from two stacked semiconductor layers 22, 24 enclosing two biasing electrodes 26, 28, the assembly forming an amplification device D1. These two layers have the same conductivity type (N or P) or one is of type N or P, whilst the other is intrinsic.

Figure 1B:
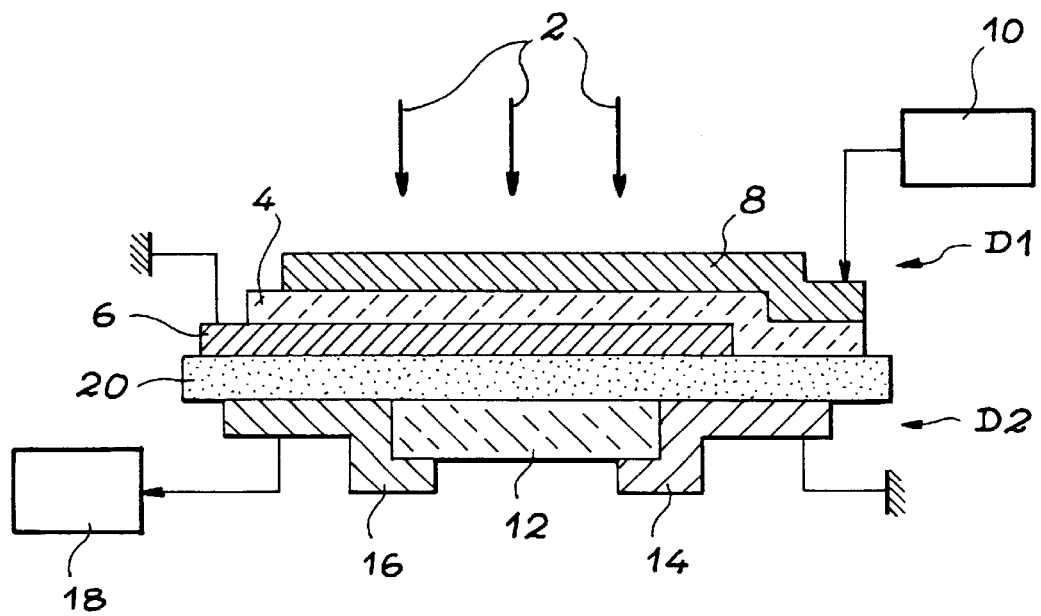

Instead of this it would be possible to use a device D1 having a single semiconductor or metal layer and two coplanar electrodes, as in FIG. 1A, or a device D1 having a single semiconductor or metal layer and two facing electrodes, as in FIG. 1B.

Device D1 is formed on one face of an electrically insulating, but thermally conductive layer 20, on whose other face is located a device D2 incorporating a thermometer.

The detector of FIG. 2 is formed by a substrate 30 and has a microbridge configuration. This type of configuration will be discussed hereinafter.

In the case of FIG. 2, the thermometer is a thermopile constituted by a series of thermocouples. The two thermocouples 34 and 36 in the embodiment shown constitute hot junctions and are electrically insulated from one another on the layer 20 by an electrically insulating element 38 e.g. of SiO, $SiO_2$ or SiN (which also covers these hot junctions, as can be seen in FIG. 2). The cold junctions of the thermopile (not shown) are brought to the temperature of the substrate 30 outside the layer 20.

The incident infrared radiation 2 leads to the heating of the resistive element. This heating is amplified or increased (as has been shown hereinbefore by a biasing source 10) and is transmitted through the layer 20 to the hot junctions of the thermocouples, which heat. Each thermocouple converts the temperature rise into an output voltage and, by a series-connection of the thermocouples 34, 36, the resulting voltage is the sum of these output voltages. The thermopile (hot and cold junctions) is then connected to the reading circuit 18 in order to read off the temperature.

In exemplified manner, the thermopile is produced from films formed from metals, semimetals (e.g. Sb, Bi or Te) or semiconductors (e.g. $Bi_2Te_3$ or polysilicon).

In another thermal detector according to the invention (not shown), the device D2 of FIG. 2 is replaced by a PN or NP semiconductor junction or by a Schottky barrier, whereof measurement then takes place of the saturation current in order to form the signal, which is read by the reading circuit 18. It is also possible to replace the thermopile of FIG. 2 by a metal or semiconductor resistance or resistor, whose configuration and biasing are chosen so as to optimize the performance characteristics of the thermometer.

Figure 3:
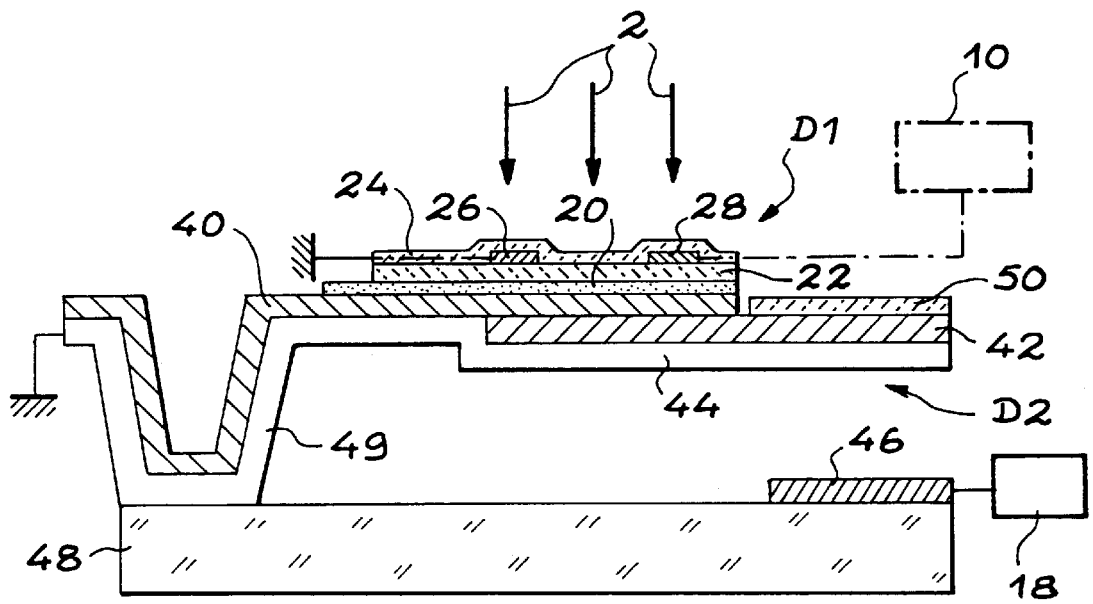

The detector according to the invention, which is diagrammatically shown in FIG. 3, is a bolometrically amplified, mechanical deformation detector. The device D1 of said detector is identical to that of FIG. 2 (or to one of the variants thereof referred to hereinbefore). The device D2 of the detector of FIG. 3 is a biplate formed by two plates 40 and 42, the plate 40 being on one side in contact with the corresponding face of the layer 20 and on the other side with the other plate 42.

The materials of the plates 40 and 42 are e.g. conventional microelectronics materials, such as e.g. Al, SiO, SiN and SiC.

The biplate is associated with a capacitor, one plate or armature 44 of said capacitor being fixed to the plates 40 and 42, as can be seen in FIG. 3, whilst the other armature or plate 46 rests on an e.g. Si substrate 48. It can be seen that the armature 44 and plate 40, which are in contact with one another, extend beyond the layer 20 (left-hand part of FIG. 3) by means of a common arm 49 for fixing to the substrate 48. The dielectric of the capacitor can be air or vacuum (and in the latter case the device is placed under vacuum).

The heating of the device D1 is also transmitted through the layer 20 to the biplate, which deforms under the effect of the heat and gives rise to a variation in the capacitance-of the capacitor to which it is fixed. The plate 44 is earthed, whilst plate 46 formed on the substrate 48 is connected to an input of the reading circuit 18, so that it is able to measure the temperature.

The response of device D2 of FIG. 3 is directly linked to the square of the length of the biplate, which is prejudicial with regards to the mechanical stability of the structure and the reduction of the size of elementary points in the case of a matrix detector. These disadvantages are obviated by the addition of device D1 according to the invention.

In FIG. 3, reference 50 represents a layer e.g. of TiN, placed on part of the plate 42, which projects beyond plate 40, and whose function is to absorb the incident radiation 2, thus increasing the heating of the biplate.

Figure 4:
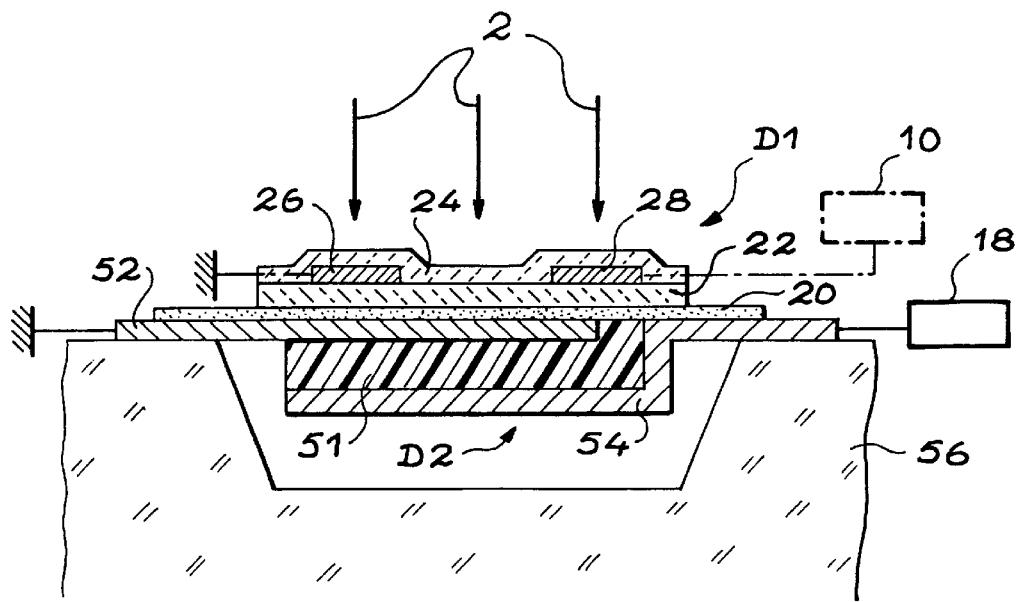

The detector according to the invention diagrammatically shown in FIG. 4 has the same device D1 as the detector of D2 (or one of the variants of said device D1) and its device D2 comprises a ferroelectric thermometer. This device comprises a ferroelectric material element 51 and two plates or armatures 52 and 54 forming the two electrodes of the thermometer. Plate 52 is in contact with the electrically insulating, thermally conducting layer 20. Element 51 is placed between the two plates and also comes into contact with the layer 20, the other plate 54 passing along said element so as to also contact the layer 20, as can be seen in FIG. 4. The detector of FIG. 4 also has a microbridge structure and rests by respective ends of the plates 52, 54 on a support 56, e.g. of Si, the plates 52 and 54 being mutually electrically insulated. The plate 54 supplies the signal of the thermometer, which is read by the reading circuit 18, the other plate 52 being earthed.

A ferroelectric thermometer has two operating modes. Thus, during a temperature rise, the spontaneous biasing of ferroelectric material decreases in order to become zero at the Curie point. The relative permittivity of the material reaches a maximum in said phase transition region.

1) In the pyroelectric mode, use is made of the spontaneous biasing decrease when the temperature of the thermometer increases and this is represented by a variation in the charge quantity on the electrodes constituted by the plates 52 and 54 forming a capacitor with the ferroelectric element 51. This variation can be read by means of the return current to the electric equilibrium or by means of the voltage variation between these electrodes 52 and 54. Two criteria define the operating mode of a ferroelectric thermometer in the pyroelectric mode, namely (a) the value of the operating temperature relative to the Curie point and (b) the value of the external electric field applied to the sample.

2) With regards to the capacitive bolometer operating mode of the ferroelectric thermometer, in this mode working takes place close to the Curie point and in the presence of an electric field, which stabilizes the biasing. In this configuration the dielectric constant rapidly varies with the temperature.

In order to fully benefit from the amplification effect, the devices D1 and D2 of the detector of FIG. 4 must be compatible, particularly with regards to the operating temperature. This adaptation can be brought about by acting on the characteristics of the materials (Curie point of device D2 and temperature coefficient of device D1) and the configuration of the detector (particularly the thermal conductance and the value of the resistance of device D6). The ferroelectric material can be constituted by a crystalline material such as TGS or $LiTaO_3$ or a ceramic such as $PbTiO_3$ or PZT or a semicrystalline polymer such as PVDF or PVDF-TrFE.

Figure 5A:
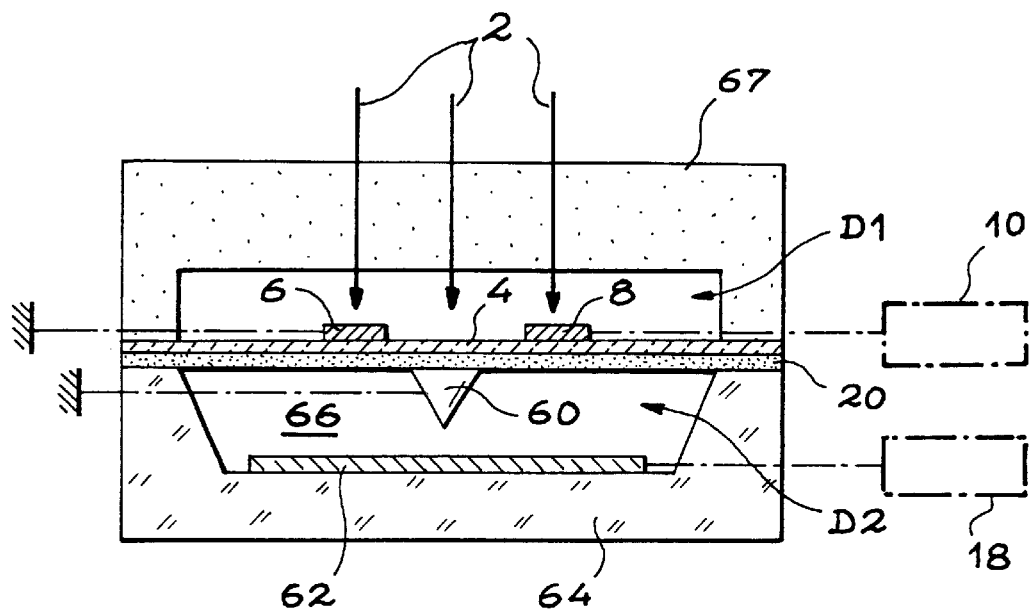

The thermal detector according to the invention and which is diagrammatically shown in FIG. 5A comprises a device D1 of the same type as in FIG. 1A and a device D2 incorporating a thermometer comprising an e.g. Si microtip 60 covered with a metallic material (e.g. Au or Cr), formed on the face of the layer 20 corresponding to device D2, as well as an electrode 62 (conductive layer) positioned facing the microtip 60 on an electrically insulating substrate 64, e.g. of oxidized or passivated silicon. In the example shown, the thermal detector has a microbridge structure, the layer 20 (separating the devices D1 and D2) resting by its ends on the substrate 64, which has a vacuum cavity 66 facing the microtip, the electrode 62 resting on the bottom of said cavity.

The microtip is e.g. earthed and the electrode 62 connected to the reading circuit 18 for measuring the temperature. In place of a single microtip, it would be possible to use a plurality of electric ally interconnected microtips formed on the same face as the microtip 60 facing the electrode 62.

As a variant (FIG. 5B), the electrode 62 is formed on the layer 20, whilst the microtip or microtips are formed on the bottom of the cavity 66 formed in the substrate 64.

During the amplification of the heating of device D1, the thin layer 20 deforms and the distance between the microtip 60 and electrode 62 is modified. This e.g. results in a variation of the current, when the potential difference between the microtip and the electrode 62 is fixed by not shown biasing means.

Figure 5B:
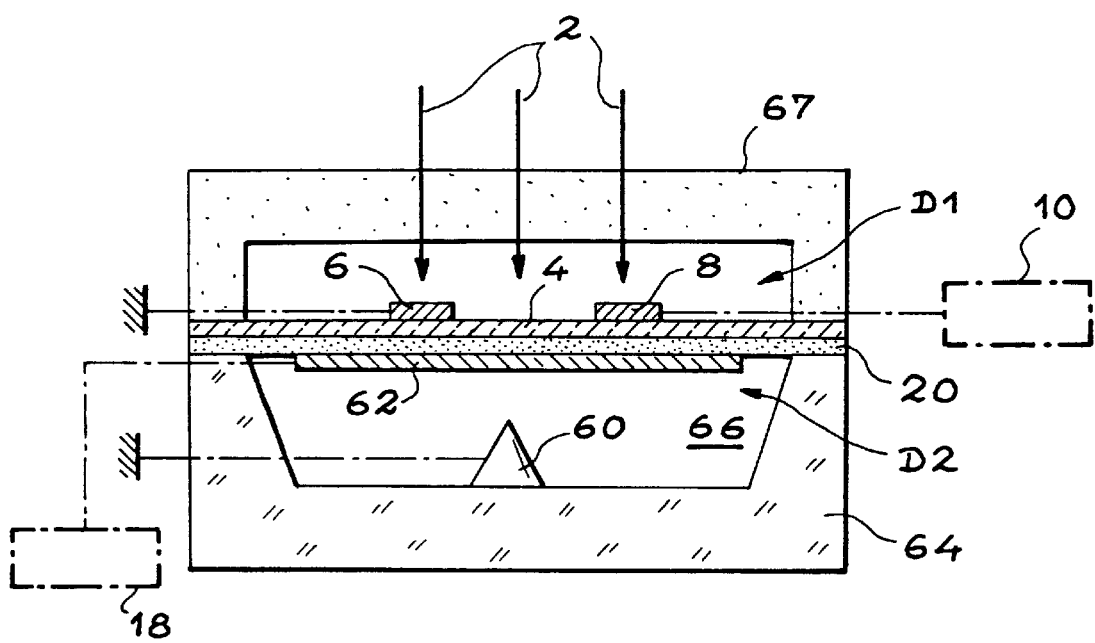

A thermal detector according to the invention can be capsulated under vacuum or a gas. The detector is then encapsulated in a case having a transparent window in the wavelength range of the radiation to be detected, e.g. band III. In the case of FIGS. 5A and 5B, a cover 67 tightly encloses the device D1. In the space between said cover and the semiconductor or metal layer of device D2 is located a gas (e.g. air), which has a low heat conduction. Said cover is e.g. of germanium and is transparent to the infrared radiation 2 to be detected and consequently serves as a window.

In the case of encapsulation under gas, it is thus possible to obtain a pneumatic thermometer detector, the expansion of the gas by heating by contact with the device D1 leading to a deformation of the layer 20. This deformation can be detected by a laser detection means or some other optical device making it possible to obtain the electrical signal, which is then read. If said detection means is replaced by a microtip and the associated electrode, as described hereinbefore, the thermal detector will be improved. Thus, the pressure exerted by the heated gas will give rise to a deformation of the layer 20 increasing if the other face of said layer is in a vacuum.

Figure 6:
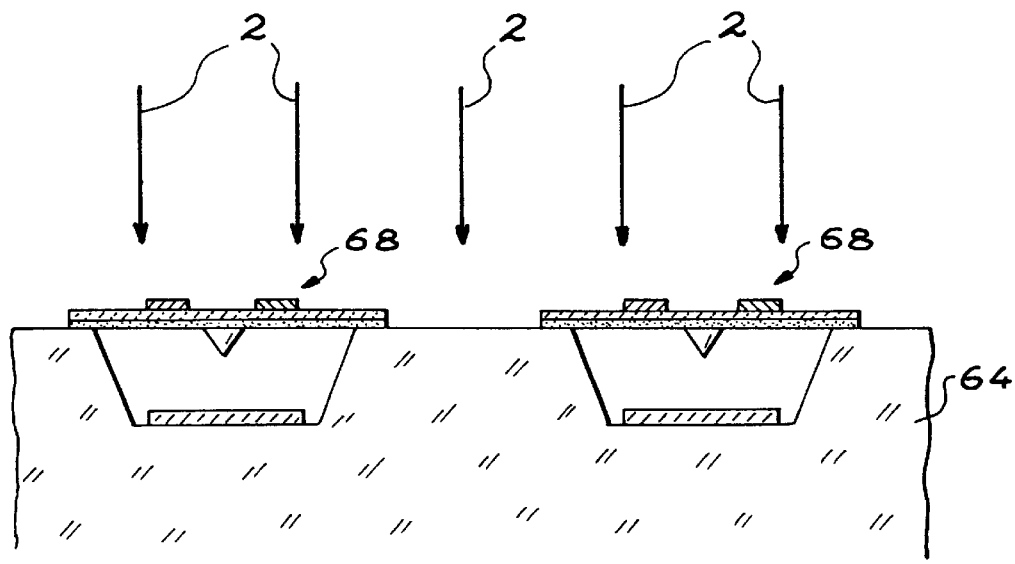
FIG. 6 A diagrammatic view of a thermal detector according to the invention having a matrix structure.

FIG. 6 diagrammatically illustrates the possibility of implementing a thermal detector according to the invention having a matrix architecture making it possible to carry out imaging, particularly infrared imaging (as in French patent application 95.07151 of Jun. 15, 1995 and French patent application 96.10005 of Aug. 8, 1996). It is thus possible to implement monolithic infrared imaging means operating at ambient temperature by directly connecting such a matrix detector to a CMOS or CCD-type silicon multiplexing circuit. FIG. 6 shows an example of such a detection matrix, whereof all that is shown consists of two identical detectors 68 of the type of FIG. 5A and formed on the same substrate 64.

The use of film microstructures makes it possible to bring about an effective thermal insulation of the detection matrix with respect to the silicon substrate 64 or the multiplexing circuit. These microstructures can e.g. be produced according to different processes, which lead to the production of microbridges and make it possible to obtain detectors with a better quality.

It is pointed out that for the production of the resistive elements of devices D1 and the thermometers of D2, use is advantageously made of microelectronics methods.

Figure 7:
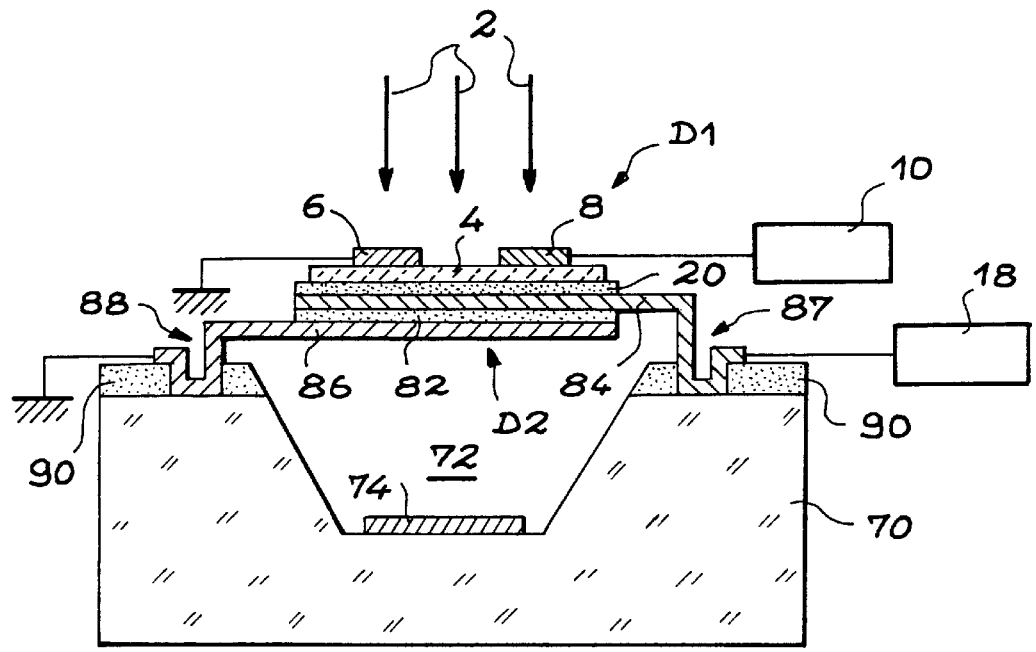
FIGS. 7 & 8 Diagrammatically thermal detectors according to the invention having a microbridge structure.
Figure 8:
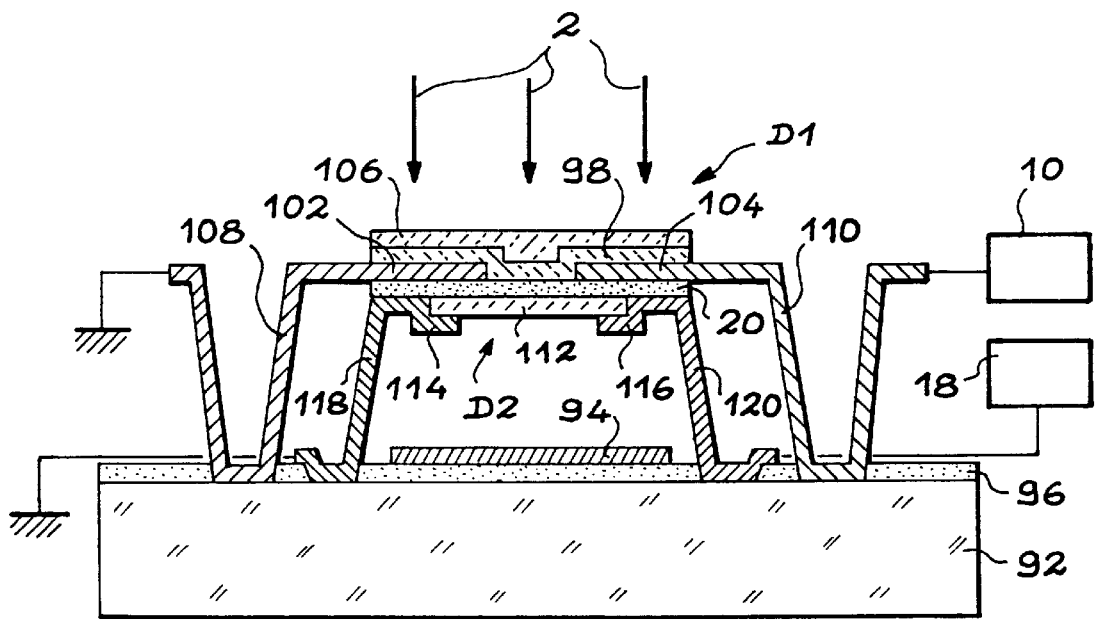

FIGS. 7 and 8 diagrammatically illustrate the manufacture of thermal detectors according to the invention having a microbridge configuration.

FIG. 7 shows a silicon substrate 70 equipped with a not shown reading circuit and having a cavity 72, at the bottom of which is located a reflecting layer 74 able to reflect the incident infrared radiation which it is wished to detect 2. The thermal detector according to the invention is fixed to the substrate, above said cavity and facing the reflective layer. It is possible to see the device D1 of said detector and which is identical to the device D1 of FIG. 1 (the same components having the same references). It is also possible to see the thin layer 20 separating said device D1 from the device D2 and which in the embodiment shown comprises a ferroelectric layer 82 between two conductive armatures 84, 86. These armatures 84, 86 extended by insulating arms 87, 88 make it possible to maintain the detector at a fixed distance from the substrate and the fixing of said detector to said substrate through a passivating layer 90 formed on said substrate. The detector is placed under a vacuum or a gas with limited heat conducting properties in the embodiment shown and the same applies for cavity 72. In the detector of FIG. 7, the microbridge is formed by underetching the silicon substrate beneath the detector, thus partly insulating said detector from the substrate.

In the embodiment of FIG. 8, it is also possible to see a silicon substrate 92 provided with a not shown reading circuit. The thermal detector according to the invention overhangs said substrate 92. Facing said detector is located a reflecting layer 94 placed on a passivating layer 96 covering said substrate. It is possible to see the resistive-element of the detector, incorporating a semiconductor or metal layer 98 formed on the thin layer 20 and provided with two electrodes 102, 104 positioned between said layers 98 and 20. A layer 106 able to absorb infrared radiation 2 is optionally placed above the layer 98 (and layer 20 provided with electrodes 6 and 8 in the case of FIG. 7). The two electrodes 102, 104 are extended by insulating arms 108, 110 and also permit the fixing of the detector to the substrate through the passivating layer and provided with metal coatings for ensuring the electrical contacts of electrodes 102, 104 with the addressing and reading circuit. The detector thermometer 112 is also provided with two electrodes 114, 116 extended by two arms 118, 120, which are in contact with the substrate through the passivating layer and provided with metal coatings for ensuring the electrical contacts of electrodes 114, 116 with the addressing and reading circuit. This detector is also placed in a vacuum or under a weakly heat conducting gas. The microbridge is formed from a sacrificial layer, typically of polyimide, on which has been produced the detector and is finally etched in the manner shown in FIG. 8.

It is pointed out that the thin layers or films (0.05 to 1 $\mu$m) of the insulating material elements (e.g. SiN, SiO, ZnS) and the amorphous or polycrystalline, semiconductor material elements (e.g. vanadium oxides such as $V_2O_5$ or $VO_2$ produced in a semiconductor phase, Si, Ge, SiC, Si:H, SiGe:H, SiC:H, $Bi_2Te_3$) are obtained with the aid of low temperature deposition methods conventionally used for such materials: sol-gel deposition, cathodic sputtering, thermal decomposition (LPCVD) or plasma assisted deposition (PECVD).

The optional doping of said layers takes place by introducing a doping gas (e.g. $BF_3$ or $PH_3$) into the reactor or by ion implantation. These materials can be etched by plasma assisted or plasma unassisted chemical etching processes.

The film-type metallic materials (e.g. Ti, TiN, Pt, Al, Pd, Ni, NiCr, W, WSi, Sb, Bi) constituting the thermopiles, the resistive elements, the electrodes and the various metal coatings, are also deposited by cathodic sputtering or thermal decomposition (LPCVD) or plasma assisted deposition (PECVD). These metal coatings are defined by chemical etching processes, plasma etching processes or a lift-off process. The thickness of these coatings is between 0.005 and 1 $\mu$m.

The ferroelectric polymers (PVDF and PVDF-TrFE) are deposited by centrifuging in the form of 0.05 to 1 $\mu$m films.

In the absence of an absorber at the top of a detector, the electrodes of the device 21, play, with the reflector 82 or 94, an essential part in the absorption of the radiation 2. Moreover, as for the absorber, the square resistance of the layers permitting the formation of the electrodes of devices D1 and D2 and the distance between these electrodes and the reflector must be controlled in such a way as to obtain a quarter wave cavity leading to the maximum absorption at the wavelength of approximately 10 $\mu$m (in the case of an infrared radiation 2).

These electrodes can be connected to the reading circuit by conventional contact regain processes and can be adapted to the structure of the microbridge in the case of FIGS. 7 and 8.

The highest performance detectors according to the invention are those having the best bolometric structure (device D1) namely: (a) a good thermal insulation by the use of low thermal conductivity materials and an arm structure appropriate for said thermal insulation leading to a thermal resistance 1/G (inverse of the conductance G) of a high level of $5\times10^5$ to $5\times10^7$ K/W, (b) a bolometric material with a high activation energy $E_a$ inter alia dependent on the doping (the most interesting materials being oxides of vanadium, amorphous silicon and amorphous SiGe) and (c) a good efficiency by the use of a quarter wave cavity defined, in the device of FIG. 7 or 8, placed under vacuum, by the reflecting layer 74 (or the layer 94).

What is claimed is:

1. Thermal detector for measuring heat from a scene, characterized in that it comprises:
    a resistive heat amplifying element (4; 22, 24) able to undergo a heating from said scene and provided with electrical biasing means (6, 8; 26, 28) for causing the element to amplify said heating,
    a thermometer (12; 34, 36; 40, 42, 44, 46; 51, 52, 54; 60, 62) thermally coupled to the resistive heat amplifying element and able to convert a temperature variation undergone by said thermometer into an electric signal, said thermometer receiving and measuring amplified heat from said scene via said resistive heat amplifying element, said heat amplifying element amplifying heat input to said thermometer proportionately to heat from the scene, and
    means (18) for reading said electric signal.

2. Detector according to claim 1, wherein the resistive element comprises at least one resistive layer (4; 22, 24) and the biasing means comprise two electrodes (6, 8; 26, 28), the assembly formed by said layer and said two electrodes being electrically insulated from the thermometer.

3. Detector according to claim 2, wherein the electrodes are placed on the same side of the resistive layer.

4. Detector according to claim 2, wherein the electrodes are placed on either side of the resistive layer.

5. Detector according to claim 1, wherein the resistive element has a negative temperature coefficient, the biasing then being a voltage biasing.

6. Detector according to claim 5, wherein the resistive element is made from a material chosen from within the group consisting of oxides of vanadium, amorphous silicon and amorphous SiGe.

7. Detector according to claim 1, wherein the resistive element has a positive temperature coefficient, the biasing then being a current biasing.

8. Detector according to claim 1, wherein the thermometer is chosen from within the group consisting of thermopiles (34, 36), p-n junctions, Schottky barriers, electrical resistors, ferroelectric thermometers (51, 52, 54), pyroelectric thermometers, mechanical deformation thermometers (42, 44, 46, 48), pneumatic thermometers, and thermometers having at least one microtip (60).

9. Detector according to claim 1, wherein the thermometer is produced by a microelectronics procedure.

10. Detector according to claim 1, wherein the resistive element is produced by a microelectronics procedure.

11. Detector according to claim 1, which has a microbridge structure.

12. Thermal detector having a matrix structure, comprising at least two detectors (68) according to claim 1.

13. Thermal detector according to claim 1, wherein each resistive element is provided for undergoing heating by means of infrared radiation (2).

* * * * *